J. EDMISTON.
SCHOLASTIC APPLIANCE FOR TEACHING THE READING OF CLOCK DIALS AND THE DISTINGUISHING OF COLORS.
APPLICATION FILED OCT. 10, 1914.

1,143,519.

Patented June 15, 1915.
2 SHEETS—SHEET 1.

WITNESSES
L. H. Grote
M. E. Keir

INVENTOR
JOHN EDMISTON
BY Henson and Henson
his ATTORNEYS

J. EDMISTON.
SCHOLASTIC APPLIANCE FOR TEACHING THE READING OF CLOCK DIALS AND THE DISTINGUISHING OF COLORS.
APPLICATION FILED OCT. 10, 1914.

1,143,519.

Patented June 15, 1915.
2 SHEETS—SHEET 2.

WITNESSES
L. H. Grote
M. E. Klein

INVENTOR
JOHN EDMISTON
BY Henson and Henson
his ATTORNEYS

UNITED STATES PATENT OFFICE.

JOHN EDMISTON, OF GLASGOW, SCOTLAND.

SCHOLASTIC APPLIANCE FOR TEACHING THE READING OF CLOCK-DIALS AND THE DISTINGUISHING OF COLORS.

1,143,519.   Specification of Letters Patent.   Patented June 15, 1915.

Application filed October 10, 1914.   Serial No. 866,072.

*To all whom it may concern:*

Be it known that I, JOHN EDMISTON, a subject of the King of Great Britain and Ireland, and a resident of Glasgow, Scotland, have invented a certain new and useful Scholastic Appliance for Teaching the Reading of Clock-Dials and the Distinguishing of Colors, of which the following is the specification.

The invention has for its object to provide a simple appliance for teaching children to read clock dials and to distinguish colors.

The apparatus consists essentially of a fixed dial provided with means for clamping it to a blackboard or the like. Pivoted in and traversing the dial are hour and minute hands geared together in usual horological manner, the hands being connected by gearing with a handle or the like for operating them preferably through a universally-jointed shaft. In the dial are two series of apertures in radial line corresponding with the hour positions. Centrally at the back of the dial are pivoted two disks, one bearing a series of Roman and of Arabic symbols, either of which may be brought behind one series of dial apertures by adjustment of the disk, and another, it may be bearing numerals indicative of minutes and which may be brought behind the other series of apertures. The dial may in addition be marked with the usual horological divisions.

In order that the distinguishing of color may be taught, there may be provided a disk attachable to the minute spindle by a bayonet or like catch and bearing on one or both faces a series of differently colored segments. This disk may of course be rotated by manipulation of the hand-operating handle, and there is provided to coact with it a pointer so hinged to the dial that it may be turned either to lie over the disk or above the dial and out of sight.

Figure 2:
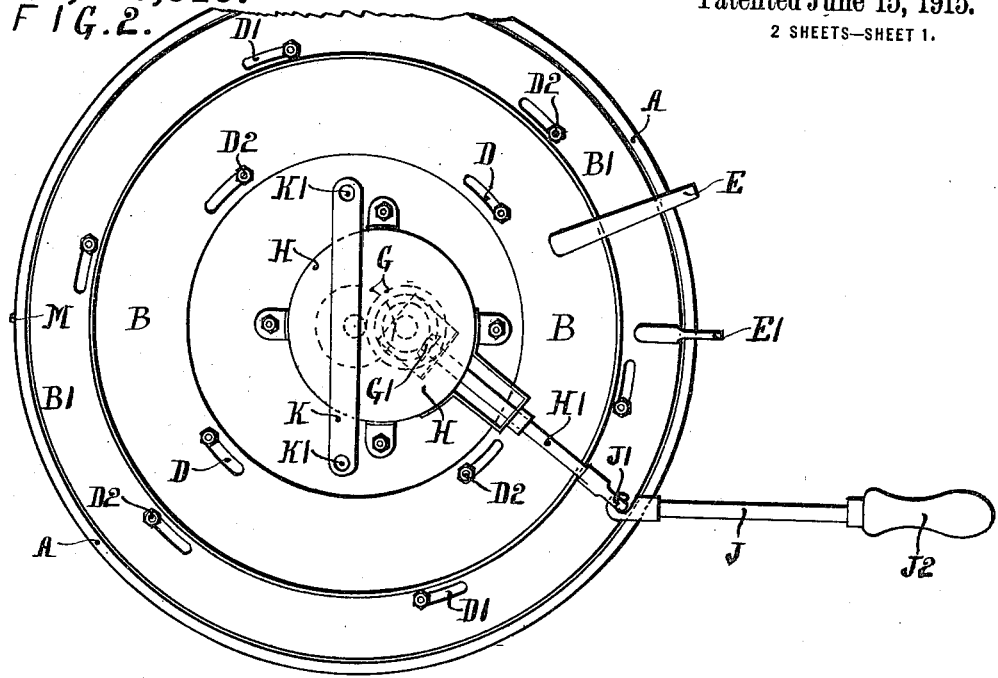
Figure 1:
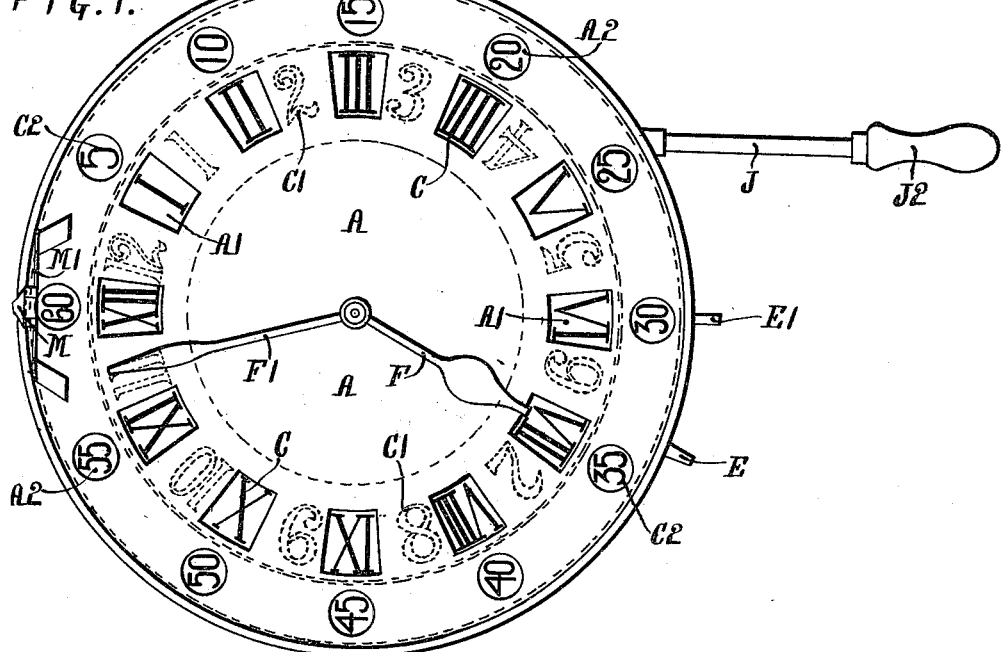
Figure 4:
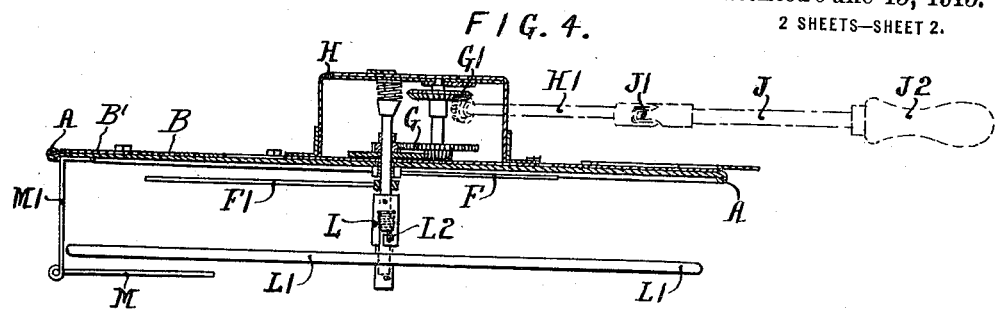

The improved appliance is shown on two sheets of accompanying drawings. In these drawings Figures 1 and 2, Sheet 1 are front and rear views respectively of the part of the appliance for teaching the reading of a clock dial, Fig. 3, Sheet 2, being a front view showing the colored disk in position, while Fig. 4, is a part sectional side elevation of the complete appliance.

As shown in the drawings, the apparatus comprises a fixed dial A having in it two series of apertures $A^1$, $A^2$ arranged in radial line and corresponding to the hour positions on a usual clock face. Centrally at the back of the dial A are arranged two disks B, $B^1$ covering the two series of apertures $A^1$, $A^2$. The disk B bears on it two series of numbers, one of Roman symbols C and another of Arabic symbols $C^1$. The other disk $B^1$ bears a series of numerals $C^2$ indicative of minutes. The two disks B, $B^1$ have each a series of curved slots D, $D^1$ with which engage pins $D^2$ secured on the back of the dial A. A limited rotation of the disks is thus permitted. The two series of symbols C, $C^1$ are so placed on the disk B that one or other of the series may be brought behind the apertures $A^1$ by adjustment of the disk by means of a handled attachment E. The other disk $B^1$ has on it a similarly handled attachment $E^1$ by means of which the series of numerals $C^2$ on the disk $B^1$ can be brought behind the apertures $A^2$. Hour and minute hands F, $F^1$ traverse the dial, being geared together in usual horological manner by gearing G driven from bevel gearing $G^1$. The gearing G, $G^1$ is inclosed in a casing H secured on the back of the dial A. Extending out through the casing H there is a shaft $H^1$ bearing on its inner end the bevel pinion of the gearing $G^1$. The outer end of the shaft $H^1$ is attached to one end of a rod J by means of a universal joint $J^1$, while the other end of the rod J has on it a handle $J^2$ from which the gearing is operated. A strap K is secured to the casing H and has in it apertures $K^1$ by means of which the apparatus may be attached to a blackboard or the like.

Figure 3:
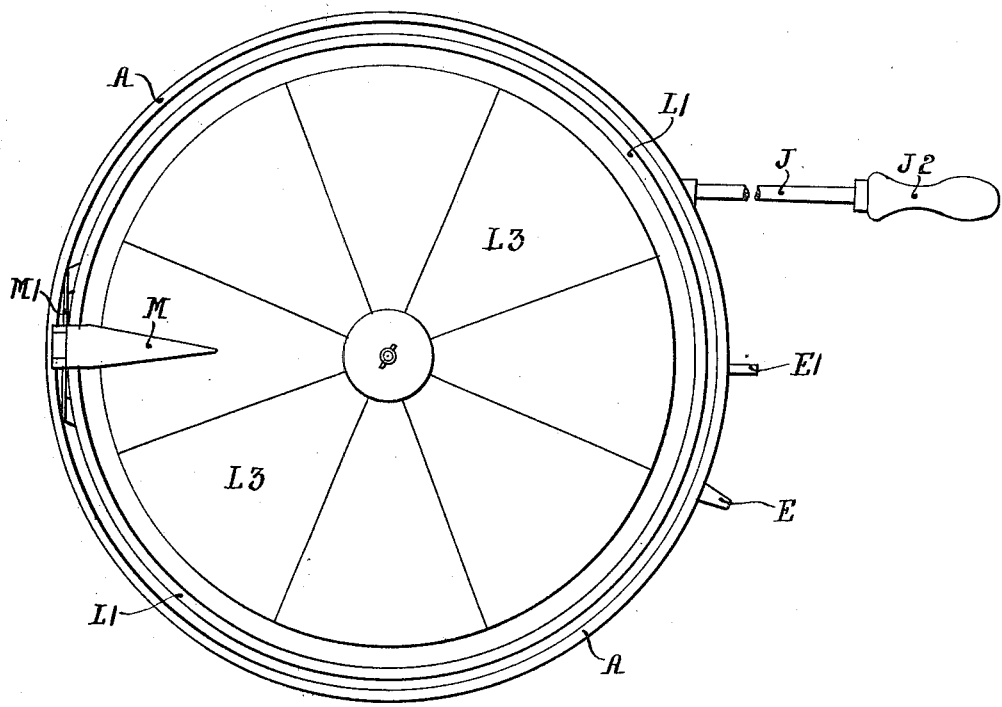

In order that the distinguishing of colors may be taught, the minute spindle carries an extension L to which is attached a disk $L^1$ by means of a bayonet joint $L^2$. The disk $L^1$ has on one or both of its faces a series of segments $L^3$, as indicated in Fig. 3, these segments being differently colored. The disk can be rotated by means of the handle $J^2$, and there is provided to coact with it a pointer M, so that when the disk is stopped the pointer lies over and indicates which of the colored segments $L^3$ has to be named. The pointer M is so hinged on a bracket M¹ secured on the face of the dial, that it may be turned either to lie over the disk, or above the dial and out of sight.

What I claim is:—

1. In a scholastic appliance for the purpose described; a fixed dial, two hands traversing the dial and geared together in usual horological manner, apertures in the dial, and two adjustable symbol-bearing disks, one of lesser diameter than the other, arranged concentrically at the back of the dial so that the symbols may be brought behind the apertures.

2. In a scholastic appliance for the purpose described; a fixed dial, two hands traversing the dial and geared together in usual horological manner, apertures in the dial, and two adjustable symbol-bearing disks, one of lesser diameter than the other, arranged concentrically at the back of the dial so that the symbols may be brought behind the apertures, a spindle axial to said dials, a pair of hands mounted on said spindle and traversing the faces of said dials, together with means at the front of said spindle for making quickly detachable connection with an independent member.

3. In a scholastic appliance for the purpose described; a fixed dial, two hands traversing the dial and geared together in usual horological manner, apertures in the dial, and two adjustable symbol-bearing disks, one of lesser diameter than the other, arranged concentrically at the back of the dial, slots in the disks, upstanding pins on the back of the dial engaging the slots, and handles on the disks by means of which the position of the disks may be adjusted.

4. In a scholastic appliance for the purpose described; a fixed dial, two hands traversing the dial, and geared together in usual horological manner, apertures in the dial, and two adjustable symbol-bearing disks, one of lesser diameter than the other, arranged concentrically at the back of the dial, slots in the disks, upstanding pins on the back of the dial engaging the slots, and handles on the disks by means of which the position of the disks may be adjusted, an additional disk bearing differently colored segments, and means for detachably securing this disk to the minute spindle.

5. In a scholastic appliance for the purpose described; a fixed dial, two hands traversing the dial and geared together in usual horological manner, apertures in the dial, and two adjustable symbol-bearing disks, one of lesser diameter than the other arranged concentrically at the back of the dial so that the symbols may be brought behind the apertures, in combination with an independent, variously-colored supplemental disk, means for detachably mounting the same coaxially with the hands and a pivoted pointer adapted to coact with said supplemental disk in mounted position.

6. In a scholastic appliance for the purpose described; a fixed dial, two hands traversing the dial and geared together in usual horological manner, apertures in the dial, and two adjustable symbol-bearing disks, one of lesser diameter than the other, arranged concentrically at the back of the dial, slots in the disks, upstanding pins on the back of the dial engaging the slots, and handles on the disks by means of which the position of the disks may be adjusted, an additional independent disk bearing differently colored segments, and means for detachably securing this disk to the minute spindle, and a pivoted pointer coacting with the additional disk in mounted position.

7. In a scholastic appliance for the purpose described, a dial forming a front frame element, a spindle passing through said dial, and having means at its front end to afford a quickly detachable connection with a scholastic appliance, gearing for rotating said spindle and a hand-operated member for driving the gearing.

8. In a scholastic appliance for the purpose described, a dial forming a front frame element, a spindle passing axially through said dial, a color chart detachably mountable on said spindle, gearing for rotating the spindle and a hand-operated member for driving the gearing.

9. In a scholastic appliance for the purpose described, a rotary spindle, a dial through which said spindle passes, gearing for rotating said spindle, a manually operated device for actuating the gearing, and means for mounting a plurality of scholastic appliances on said spindle in front of said dial.

In testimony whereof I have signed my name to this specification, in the presence of two subscribing witnesses.

JOHN EDMISTON.

Witnesses:
　DAVID FERGUSON,
　JAMES EAGLESOM.

Copies of this patent may be obtained for five cents each, by addressing the "Commissioner of Patents, Washington, D. C."